US008632386B2

(12) United States Patent
Anderson et al.

(10) Patent No.: US 8,632,386 B2
(45) **Date of Patent: *Jan. 21, 2014**

(54) SELECT AND DRAG METHOD FOR A GAMING MACHINE

(71) Applicant: Bally Gaming, Inc., Las Vegas, NV (US)

(72) Inventors: Frank Anderson, Las Vegas, NV (US); Keith Kruczynski, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,734

(22) Filed: Sep. 17, 2012

(65) Prior Publication Data

US 2013/0017879 A1 Jan. 17, 2013

Related U.S. Application Data

(63) Continuation of application No. 12/113,205, filed on Apr. 30, 2008, now Pat. No. 8,267,763.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/16; 463/12; 463/13; 463/17; 463/20; 463/30; 273/292

(58) Field of Classification Search

USPC ............. 463/12, 13, 16, 17, 20, 30; 273/143, 273/292

See application file for complete search history.

(56) References Cited

U.S. PATENT DOCUMENTS

| | | | | |
|---|---|---|---|---|
| 5,833,536 | A | 11/1998 | Davids et al. | |
| 2003/0100357 | A1 * | 5/2003 | Walker et al. | 463/16 |
| 2004/0082378 | A1 * | 4/2004 | Peterson et al. | 463/20 |

* cited by examiner

*Primary Examiner* — David Lewis
*Assistant Examiner* — Adetokunbo O Torimiro
(74) *Attorney, Agent, or Firm* — Brooke Quist; Marvin Hein

(57) ABSTRACT

A method for playing a casino gaming device including a select and drag feature is disclosed. In one embodiment, a player selects values for multiple positions or spots on a game of chance, such as a lottery style game. The player initially selects a value in one of the game positions. The player touches a touch-screen display or other input device located above the game position displaying the initially selected value, and then touches any other game position to copy the initially selected value into the other game positions. In one method, the player touches the touch-screen display located above the touch-screen display, and then drags the initially selected value across the remaining game positions with his finger to set the values for the remaining game positions to the initially selected value.

18 Claims, 4 Drawing Sheets

SELECT AND DRAG METHOD FOR A GAMING MACHINE

CROSS-REFERENCE TO RELATED APPLICATIONS

This application is a continuation of U.S. patent application Ser. No. 12/113,205, filed Apr. 30, 2008, entitled A Select And Drag Method For A Gaming Machine, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Currently, conventional casino gaming units offer play of lottery style games. During play of a lottery style game, a player typically selects one or more game numbers from a range of game numbers, and the player's selected game numbers are compared to one or more randomly selected game numbers. The randomly selected numbers represent the winning numbers for the lottery game. If there are a sufficient number of matches between the player's game numbers and the randomly selected numbers, the player receives a payout.

For certain types of lottery style games, it is popular for players to select one particular number for all play positions or "spots" located on the lottery card. However, on an electronic lottery style game, the player is required to input a number for each and every position or spot located on the lottery card, which can be relatively time consuming. For these types of lottery games, it would be desirable to increase the speed of play when the player selects the same number used in all spots located on the lottery card.

SUMMARY

Briefly, and in general terms, various embodiments are directed to a method for playing a casino gaming device. In one embodiment, the method includes: providing a gaming device having a random number generator and a touch screen display capable of enabling play of a game of chance, wherein the game of chance displays multiple game positions for inserting values related to the game of chance; and enabling a player to select an initial unhidden value in one of the game positions and then copy the selected initial unhidden value into multiple game positions, wherein the selected initial value is copied into other game positions by touching the touch-screen display located above the game position displaying the initially selected value and then touching the touch screen display above other game positions, which automatically sets the values of the game positions to the initially selected value.

In another embodiment, a method for playing a lottery game includes: enabling play of a lottery game on a gaming device, the gaming device having a random number generator and a touch-screen display, and the lottery game displaying multiple game positions for inserting values related to the lottery game, wherein a player selects one number in each position; receiving the player input for selecting a first unhidden number in one of the game positions using the touch-screen display of the gaming machine; and copying the selected initial unhidden value into multiple game positions by detecting the player's touch on the touch-screen display located above the first selected unhidden number and populating multiple game positions with the first selected unhidden number as the detected player's touch moves across the remaining positions on the touch-screen display, which automatically sets the values of the game positions to the initially selected value.

In still another embodiment, a method for playing a lottery game includes: enabling play of a lottery game on a gaming device, the gaming device having a random number generator and a touch-screen display, and the lottery game displaying multiple number positions from a first number position to a last number position for inserting values related to the lottery game; receiving input from the touch-screen display of an initial unhidden number in one of the multiple number positions; copying the selected initial unhidden number into multiple game positions by detecting a touch on touch-screen display located above the number position with the initially selected unhidden number and detecting a touch on the touch-screen display located above multiple number positions; and using an algorithm to set the detected touched number positions to the initially selected unhidden number.

Once all values for the game positions or spots on a lottery card are filled, the game device compares the selected values to one or more randomly selected game values. The randomly selected game values represent the winning values for the game. If a sufficient number of matches between the player's selected game values and the randomly selected values generated by the random number generator, the player receives an associated payout.

Other features will become apparent from the following detailed description, taken in conjunction with the accompanying drawings, which illustrate by way of example, the features of the various embodiments.

DETAILED DESCRIPTION

Generally, various embodiments disclosed herein are directed to a gaming system including a select and drag feature. In the system, a gaming device enables play of a game where a player has the ability to select one value and drag the selected value across the screen to set all the values in a set of values for game play. In one embodiment, the gaming device enables play of a lottery style game, where a player must set a group of numbers for several spots located on a lottery card. For instance, where a player desires to select one particular number for all the spots on the lottery card, the select and drag feature of the gaming system increases the rate of play by allowing the player to easily copy an initially selected number to all of the remaining spots on the card.

Figure 1:
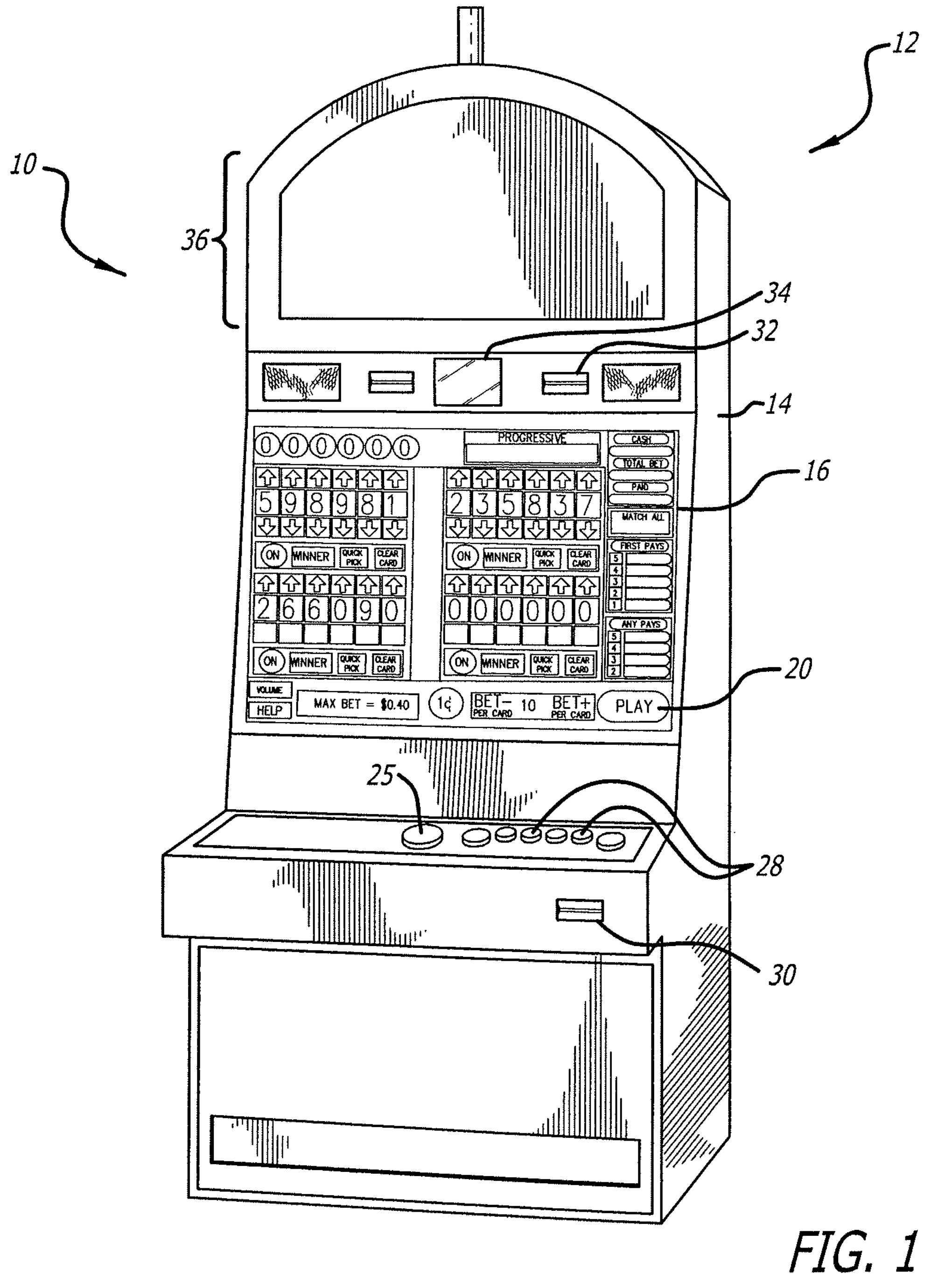
FIG. 1 depicts one embodiment of a gaming machine configured to enable play of a lottery style game.

Referring now to the drawings, wherein like reference numerals denote like or corresponding parts throughout the drawings, there are shown various embodiments of a gaming machine system presenting a select and drag feature. FIG. 1 depicts an embodiment of a gaming machine 10 enabling play of a lottery style game 12. The machine includes a gaming cabinet 14 that houses a display screen 16. In this embodiment, the display 16 includes a touch screen system. In other embodiments, the lottery style game can be replaced by any game, including video slots, video keno, video poker, video blackjack, video roulette, Class II bingo, games of skill, or games of chance involving some player skill. For the sake of brevity and clarity, the following disclosure and example of the game relates to a lottery style game, but those skilled in the art will appreciate that any of the above-referenced games or others may be presented in the gaming machine 10.

Figure 2:
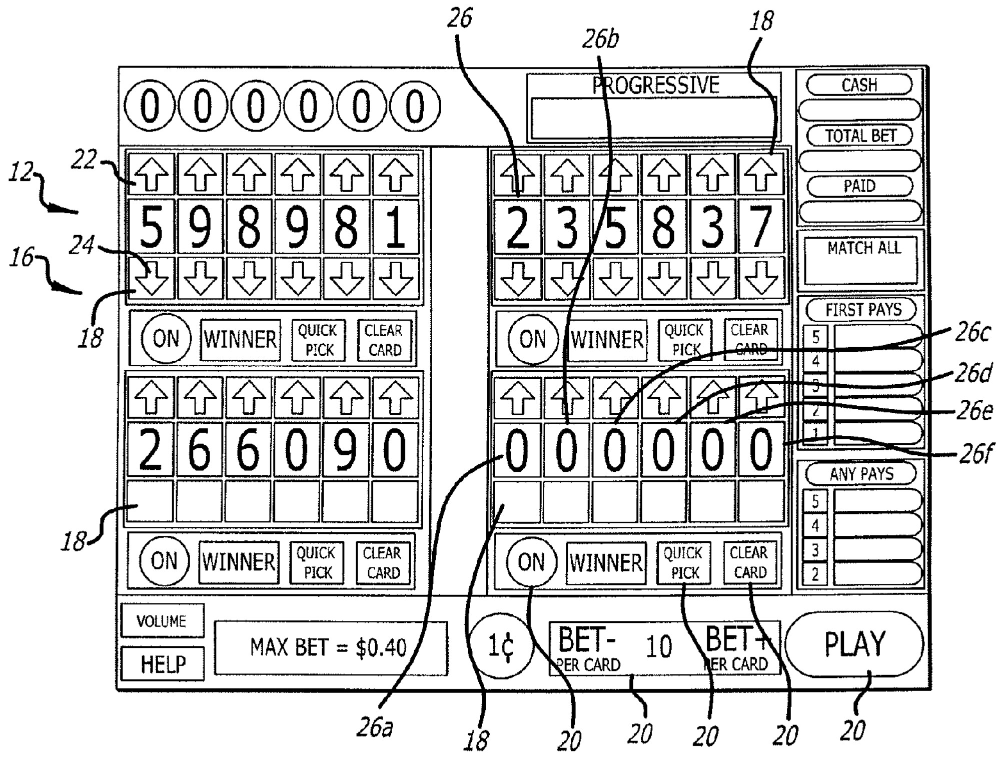
FIG. 2 depicts a close-up view of a display screen showing a lottery style game with four lottery cards on one screen.

The lottery game 12 may include a plurality of lottery cards 18 displayed on one screen. As best shown in FIG. 2, there are four separate lottery cards 18 displayed on the screen, however, any number of lottery cards may be displayed on the screen at one time. The lottery game includes a dedicated set of buttons 20 on the touch screen display 16 having functions such as, but not limited to, a collect button (or cash-out), select number of lottery cards to play, bet per card buttons, play button, quick pick button, and clear card button. In this embodiment, there are number increase buttons 22 and number decrease buttons 24 for each number position or spot 26 located on the lottery card for selecting numbers. As shown in the figures, this embodiment includes six spots 26 on each lottery card 18 for selecting a number from 0 to 9. In other embodiments, there may be more or fewer spots located on the lottery card, and still in other embodiments, symbols may be selected instead of numbers.

The gaming machine 10 shown in FIG. 1 also includes a player interface having a set of buttons 28 for the game presented on the display 16. The buttons 28 function as input mechanisms and may include mechanical buttons, electromechanical buttons, or touch screen buttons. While FIG. 1 illustrates a gaming machine having both touch screen buttons and mechanical buttons, other contemplated embodiments have only mechanical buttons or touch screen buttons. According to one embodiment, the buttons 28 are backlit to indicate whether the button is active. In another embodiment, one input mechanism is a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated herein by reference. Additionally, other input devices, such as, but not limited to, a touch pad, track ball, mouse, switches, toggle switches, are included with the gaming machine to also accept player input. In yet another embodiment, a cellular phone or other input device (e.g., PDA), separate and apart, from the gaming machine 10 may also be used to input various player choices and information to enhance the player's interactive experience with the gaming machine. In this embodiment, the gaming machine 12 also includes an IR sensor, RF sensor, BLUETOOTH receiver, or other means for receiving input from a cellular phone or other wireless input devices. Furthermore, inputting information via these devices provides an added level of security as any key presses may be hidden from view. In yet another embodiment, a player may call or send a text message or a short message service (SMS) to the gaming machine.

As shown in FIG. 1, the gaming machine 10 includes a ticket reader/ticket printer slot 30 that is associated with a cashless gaming system (not shown). According to one embodiment, the slot 30 is used for the ticket reader and ticket printer. Accordingly, the same slot 30 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher. In another embodiment, the gaming machine may allow a player to insert credit onto the gaming machine through an electronic funds transfer from a player's account. In this embodiment the slot may be a card reader for reading a credit or debit card from the player.

Additionally, each gaming machine 10 is in communication with a player tracking system (not shown). The player tracking system allows a casino to monitor the gaming activities of various players. The player tracking system typically includes a database of all qualified players (i.e., those players who have enrolled in a player rating or point accruing program). Generally, the database for the player tracking system is separate from the gaming machines. Additionally, the player tracking system is able to store data relating to a player's gaming habits as well as the player's preferences for gaming machine configuration. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

The player tracking system is operatively connected to one or more input components on the gaming machine 10. These input components include, but are not limited to, a player card slot 32 for receiving a player tracking card, a keypad or equivalent, and a display 34. Accordingly, the gaming activity of the players may be tracked. Alternatively, the gaming machine 10 includes no slot at all. If the gaming machine 10 does not include a player card slot, the players may input player identification via a touch screen, keypad, or other input mechanisms that are associated with the player tracking system in lieu of inserting a player tracking card.

In another embodiment, each gaming machine 10 includes an Internet connection or other known network connections to link the plurality of gaming machines together. According to one embodiment, the Internet connection is used for web browsing, prize redemption, or access to other gaming or non-gaming information. With various gaming machines in communication with one another (or a system host), the gaming machines 10 may participate in progressive jackpots.

The main cabinet 14 of the gaming machine 10 also houses a CPU, a random number generator, circuitry, and software for receiving signals from the player-activated buttons 20 or 28, operating the games, and transmitting signals to the game display and speakers. In certain embodiments, the game 12 and the select and drag feature are operated by the same or separate processors that are in communication with one another. In yet another embodiment, the game 12 and the select and drag feature are operated remotely via one or more servers.

According to one embodiment, the select and drag feature is a module stored on the gaming machine 10. The select and drag feature can be a processor assembly including a processor, memory tangibly embodying instructions which comprise an operating system and one or more applications. Operating system and applications are comprised of instructions which, when read and executed by the computer processor causes the function to be performed. In one embodiment, the select and drag feature may be stored on a network server that is in communication with the gaming machines 10 through a network. In another embodiment, the select and drag feature may be stored on a separate server, apart from the network server, wherein the separate server is in communication with the gaming machines 10 through the network. It has been contemplated that the separate server can be located within the gaming machine itself.

The select and drag feature includes an algorithm used to accomplish copying a selected value into all required values on a gaming device. In one embodiment, by way of example, and not by way of limitation, the algorithm used is the following:

```
for (int j=0; j<paytable->GetNumPicks( ); j++)
{
    If (target = = TicketButtonMeter[i][j])
    {
        nvLottoData.ticketMeter[i][j] = nvLottoData.ticketMeter[i][0];
        Update TicketMeter(i,nvLottoData.ticketMeter[i],j);
        TicketButtonMeter[i][j]->Disable( );
        return null;
    }
}
```

In various embodiments, one or more game programs may be stored in a memory (not shown) comprising a read only memory (ROM), volatile or non-volatile random access memory (RAM), a hard drive or flash memory device or any of several alternative types of single or multiple memory devices or structures. Optionally, each gaming machine 10 includes one or more data repositories for storing data. Examples of information stored by the gaming machine 10 include, but are not limited to, accounting data, maintenance history information, short and/or long-term play data, real-time play data, and sound data. In one embodiment, the data repository also stores display content configurations for various games and gaming machines.

In FIG. 1, the gaming machine 10 includes a top box 36 on the main cabinet 14. According to one embodiment, the top box is a separate and distinct component that is affixed to the main cabinet. In another embodiment, the top box is an area that is partitioned from the main cabinet. Alternatively, the top box and the main cabinet may be contiguous areas with the outward appearance of two distinct components. The top box may include a secondary display for displaying game information (e.g., name of the game, animation, one or more pay tables, game information, one or more help menus, progressive jackpot or game information, tournament game information, or any combination thereof) or non-game related information (e.g., news, advertisements, messages, promotions, or any combination thereof). In one embodiment, the secondary display presents a secondary game such as, but not limited to, a bonus game, progressive game, or a continuation game of the primary game. In yet another embodiment, the top box also includes a display glass that includes the name of the game, artwork, game instructions, pay table, or other information relating to one or more games presented on the gaming machine 10.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

Figure 3:
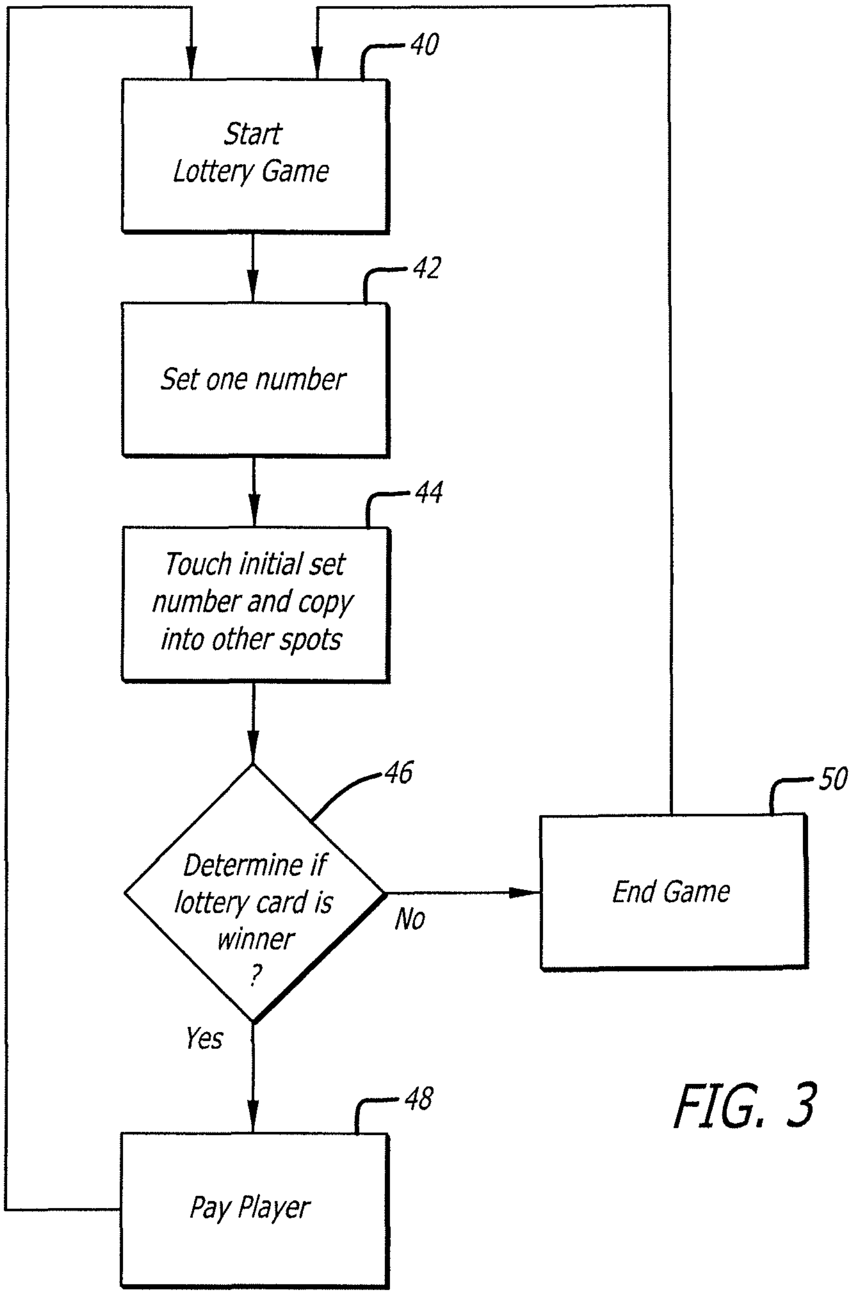
FIG. 3 depicts a flow diagram of one method using a select and drag feature on a gaming machine.

In one embodiment, a method of utilizing the select and drag feature is depicted in the flow diagram of FIG. 3. As shown at step 40, a player initiates play of a game by applying a sufficient amount of credits to a gaming device 10. The gaming device 10 enables play of a game of chance, wherein the game of chance displays multiple game positions for insertion of values related to the game of chance. As an example, the game of chance is a lottery style game where a player selects numbers (from 0 to 9) for multiple positions or "spots" located on the lottery card 18. As best shown in FIG. 2, each lottery card 18 includes six positions or spots 26*a*, 26*b*, 26*c*, 26*d*, 26*e*, and 26*f* for the player to select numbers.

In this embodiment, the player selects an initial number in the first position or spot 26*a* on the lottery card at step 42, using the number increase button 22 and/or the number decrease 24 button. In other embodiment, the player may initially select a number for any of the six positions or spots 26*a-f*. Once the initial number is selected, and the player wishes to select this particular number for all the spots located on the card, the player touches the touch-screen display located above the spot with the initially selected number. It will be appreciated that other input devices may also be used, e.g. touch glass, proximity screens, or any other means to quickly copy one value into other locations. Thereafter, the player touches any other game spot located on the lottery card 18 to copy the initially selected number into those other game spots, as indicated at step 44. In one embodiment, the player initially selects a number in the first spot 26*a*. The player then touches the touch-screen display located above the first spot 26*a*, and then drags his finger, or any other instrument, horizontally across the touch screen display 16, touching the remaining game positions in order from spots 26*a* through 26*f*. The gaming machine 10 and touch screen display 16 will recognize the touches on the display and activate the select and drag feature to easily copy the initially selected number into all spots 26 located on the lottery card. In other embodiments, instead of dragging a finger or instrument across the touch screen display, the player may simply touch the remaining game positions, and do so in any order.

As shown in the bottom-right lottery card 18 in FIG. 2, all spots 26*a-f* located on the lottery card are set to the numeral "0." To accomplish this, a player first selected "0" in the first spot 26*a* located on the lottery card, and the player then drags a finger or other instrument across spots 26*a-f* located on the lottery card to set all six spots to the numeral "0." The select and drag feature increases the rate of play for players selecting the same value for multiple spots on the card.

Selecting an initial value in one game position or spot 26 and then copying or dragging the initially selected value from one game spot to the remaining game spots includes using the algorithm associated with the gaming device 10. The algorithm allows the player to copy the initially selected value into the remaining game positions.

Once all values for the game positions or spots 26 located on the designated lottery card 18 are filled, the player selects the "play" button on the touch-screen display 16, and the gaming machine 10 compares the selected values in spots 26*a-f* to six randomly selected number values chosen by a random number generator as shown at step 46. The randomly selected game values represent the winning values for the game and can be shown on the display 16. If there are a sufficient number of matches between the player's selected game values and the randomly selected values from the random number generator, the player will receive an associated payout as shown at step 48. After the payout, the player may initiate another game by returning to step 40. If there are an insufficient number of matches between the player's selected numbers and the randomly selected numbers, the game will end at step 50 without a payout. The player may then initiate another game by returning to step 40.

Figure 4:
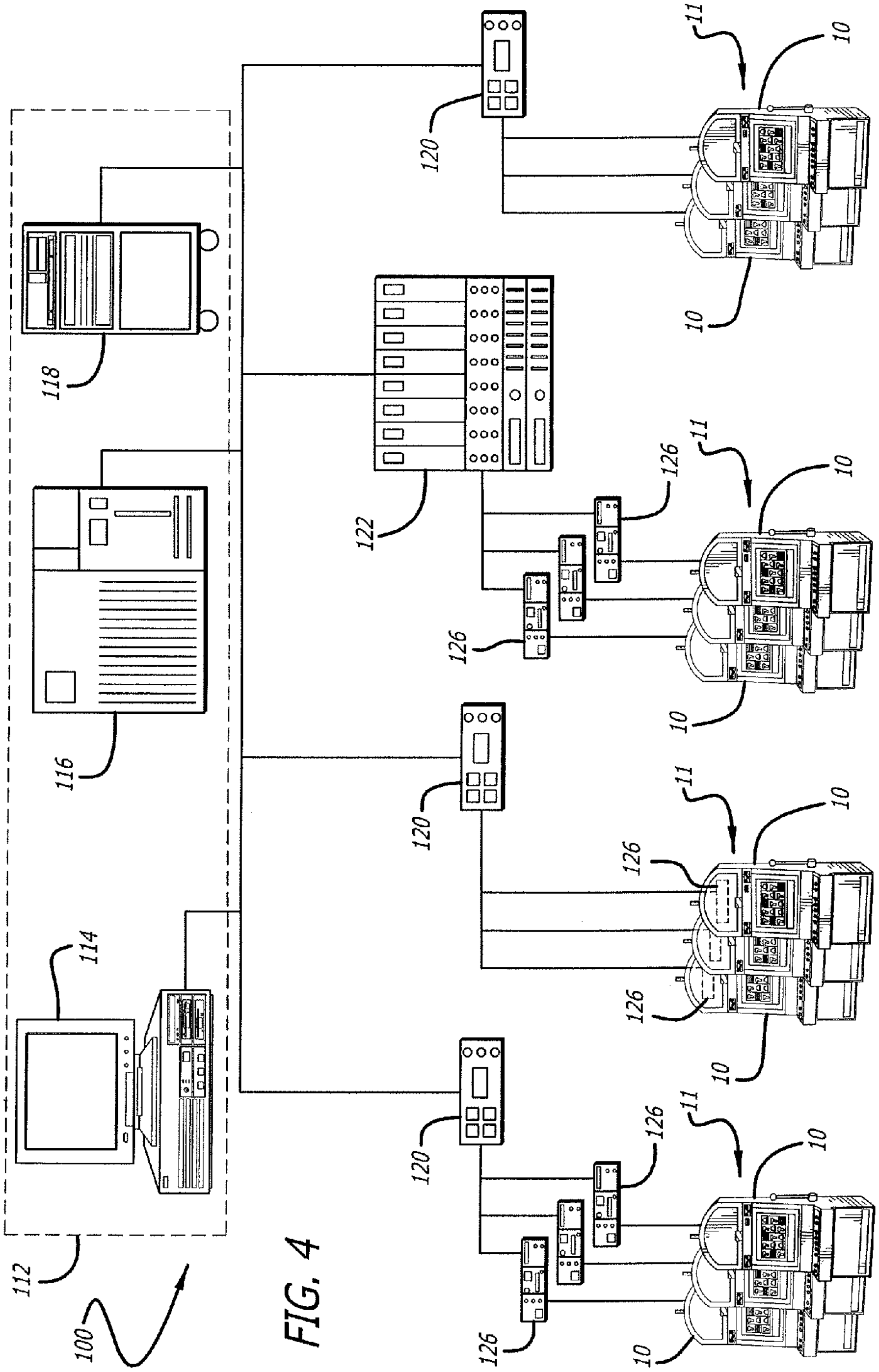
FIG. 4 depicts a diagram of one embodiment of a gaming system including a plurality of gaming machines.

Referring now to FIG. 4, a casino gaming system 100 is illustrated. The casino gaming system 100 comprises one or more gaming machines 10 and may include one or more banks of associated gaming devices 11. The gaming machine 10 illustrated in FIG. 1 acts as a terminal for interacting with a player playing a casino game. Networking components facilitate communications between a system server 112 and game management units 126 that control displays for carousels of gaming machines 10 across a network. Game management units (GMU's) 126 connect gaming machines to networking components and may be installed in the gaming machine cabinet or external to the gaming machine 10. The function of the GMU 126 is similar to the function of a network interface card connected to a desktop personal computer (PC). Some GMU's 126, have much greater capability and can perform such tasks as presenting and playing a game using a display (not shown) operatively connected to the GMU 126. In one embodiment, the GMU 126 is a separate component located outside the gaming machine 10. Alternatively, in another embodiment, the GMU 126 is located within the gaming machine 10. Optionally, in an alternative embodiment, one or more gaming machines 10 connect directly to a network and are not connected to a GMU 126. In certain embodiments, the GMU 126 may have the capacity to act as the bonus feature module.

The gaming machines 12 are connected via a network to a network bridge 120, which is used for networking, routing and polling gaming machines, including slot machines. The network bridge 120 connects to a back end system 112. Optionally, the gaming machines 10 may connect to the network via a network rack 122, which provides for a few number of connections to the back end system 112. Both network bridge 120 and network rack 122 may be classified as middleware, and facilitate communications between the back end system 112 and the game management units 126. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers, and as previously stated, the back end system can house the bonus feature module. The type of server employed is generally determined by the platform and software requirements of the gaming system. In one embodiment, as illustrated in FIG. 4, the back end system 112 is configured to include three servers: a slot floor controller 114, a casino management server 116 and a casino database 118. The slot floor controller 114 is a part of the player tracking system for gathering accounting, security and player specific information. The casino management server 116 and casino database 118 work together to store and process information specific to both employees and players. Player specific information includes, but is not limited to, passwords, biometric identification, RFID, player card identification, and biographic data. Additionally, employee specification information may include biographic data, biometric information, job level and rank, passwords, authorization codes and security clearance levels.

Overall, the back end system 112 performs several functions. For example, the back end system 112 can collect data from the slot floor as communicated to it from other network components, and maintain the collected data in its database. The back end system 112 may use slot floor data to generate a report used in casino operation functions. Examples of such reports include, but are not limited to, accounting reports, security reports, and usage reports. The back end system 112 may also pass data to another server for other functions. Alternatively, the back end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming machine accounting data, cashable ticket data, sound data, and optimal display configurations for one or more displays for one or more system game.

Of course, one will appreciate that the gaming system 100 may also comprise other types of components, and the above illustrations are meant only as examples and not as limitations to the types of components or games used in a casino gaming system presenting a group play feature.

One of ordinary skill in the art will appreciate that not all systems including a select and drag feature have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the disclosed embodiments. Those skilled in the art will readily recognize various modifications and changes that may be made to the disclosed embodiments without following the example embodiments and applications illustrated and described herein, and without departing from the true spirit and scope of the disclosed embodiments, which is set forth in the following claims.

What is claimed:

1. A method for playing a casino gaming system, the method comprising:

providing a gaming device having a random number generator and a touch screen display capable of enabling play of a game of chance, wherein the game of chance displays multiple game positions for inserting values related to the game of chance; and enabling a player to select an initial unhidden value in one of the game positions and then copy the selected initial unhidden value into multiple game positions, wherein the selected initial value is copied into other game positions by touching the touch-screen display located above the game position displaying the initially selected value and then touching the touch screen display above other game positions, which automatically sets the values of the game positions to the initially selected value.

2. The method of claim 1, further comprising receiving a prize for matching a sufficient amount of winning values.

3. The method of claim 1, further comprising dragging and setting the values for any remaining game positions to include using an algorithm associated with the gaming device.

4. The method of claim 1, wherein the gaming device enables play of a lottery game.

5. The method of claim 4, wherein the lottery game displays six game positions from a first game position to a sixth game position displayed horizontally in order on the touch-screen display.

6. The method of claim 5, wherein selecting the initial value of the first game position and touching the much-screen display located above the first game position and dragging the initially selected value across the touch-screen display from the first game position to the sixth game position.

7. The method of claim 1, wherein the values are numbers.

8. The method of claim 1, wherein the values are symbols.

9. A method for playing a lottery game, comprising:

enabling play of a lottery game on a gaming device, the gaming device having a random number generator and a touch-screen display, and the lottery game displaying multiple game positions for inserting values related to the lottery game, wherein a player selects one number in each position;

receiving the player input for selecting a first unhidden number in one of the game positions using the touch-screen display of the gaming machine; and copying the selected initial unhidden value into multiple game positions by detecting the player's touch on the touch-screen display located above the first selected unhidden number and populating multiple game positions with the first selected unhidden number as the detected player's touch moves across the remaining positions on the touch-screen display, which automatically sets the values of the game positions to the initially selected value.

10. The method of claim 9, further comprising awarding a prize for matching a sufficient amount of winning values.

11. The method of claim 9, wherein populating one or more game positions with the first selected number includes using an algorithm associated with the gaming device.

12. The method of claim 9, wherein the lottery game displays six positions from a first game position to a sixth game position displayed horizontally in order on the touch-screen display.

13. The method of claim 12, wherein receiving the player's input for selecting the first number at the first game position and detecting the player's touch on the touch-screen display located above the first game position and populating all gaming positions with the first selected number from the first game position to the sixth game position.

14. A method for playing a lottery game, comprising:

enabling play of a lottery game on a gaming device, the gaming device having a random number generator and a touch-screen display, and the lottery game displaying multiple number positions from a first number position to a last number position for inserting values related to the lottery game;

receiving input from the touch-screen display of an initial unhidden number in one of the multiple number positions;

copying the selected initial unhidden number into multiple game positions by detecting a touch on touch-screen display located above the number position with the initially selected unhidden number and detecting a touch on the touch-screen display located above multiple number positions; and using an algorithm to set the detected touched number positions to the initially selected unhidden number.

15. The method of claim 14, wherein receiving input from the touch-screen display located at the first number position.

16. The method of claim 15, wherein detecting the touch on the touch-screen display located above the number positions in order from the first number position to the last number position.

17. The method of claim 16, wherein there are six number positions.

18. The method of claim 14, further comprising using the random number generator to generate winning values; and comparing the winning values to the selected numbers in the multiple number positions.

* * * * *